United States Patent
Tapia et al.

(10) Patent No.: US 10,411,946 B2
(45) Date of Patent: Sep. 10, 2019

(54) FIXED LINE RESOURCE MANAGEMENT

(71) Applicant: TUPL, Inc., Snoqualmie, WA (US)

(72) Inventors: Pablo Tapia, Snoqualmie, WA (US); Rafael Sanchez-Mejias, Dallas, TX (US); Juan Jose Escobar, Málaga (ES)

(73) Assignee: TUPL, Inc., Bellevue, WA (US)

(*) Notice: Subject to any disclaimer, the term of this patent is extended or adjusted under 35 U.S.C. 154(b) by 256 days.

(21) Appl. No.: 15/621,926

(22) Filed: Jun. 13, 2017

(65) Prior Publication Data

US 2018/0131559 A1    May 10, 2018

Related U.S. Application Data

(60) Provisional application No. 62/350,115, filed on Jun. 14, 2016.

(51) Int. Cl.
*H04L 12/24* (2006.01)
*H04M 3/22* (2006.01)
*H04Q 3/00* (2006.01)

(52) U.S. Cl.
CPC ...... *H04L 41/0631* (2013.01); *H04L 41/0654* (2013.01); *H04L 41/0686* (2013.01); *H04L 41/5009* (2013.01); *H04M 3/22* (2013.01); *H04Q 3/0062* (2013.01)

(58) Field of Classification Search
CPC .................................................. H04L 41/0631
USPC .......................................................... 709/224
See application file for complete search history.

(56) References Cited

U.S. PATENT DOCUMENTS

| | | | |
|---|---|---|---|
| 7,050,396 B1 | 5/2006 | Cohen et al. | |
| 7,743,128 B2 * | 6/2010 | Mullarkey | H04L 41/5003 |
| | | | 702/182 |
| 8,582,584 B2 | 11/2013 | Rieger et al. | |
| 8,793,363 B2 * | 7/2014 | Sater | H04L 67/36 |
| | | | 709/224 |
| 9,820,146 B2 * | 11/2017 | Gross | H04W 12/06 |
| 10,148,588 B1 * | 12/2018 | Sledz | G06F 17/00 |
| 2003/0217129 A1 * | 11/2003 | Knittel | H04L 41/0856 |
| | | | 709/223 |
| 2004/0220926 A1 * | 11/2004 | Lamkin | G06F 21/10 |
| 2005/0007249 A1 * | 1/2005 | Eryurek | G05B 23/027 |
| | | | 340/511 |
| 2009/0240366 A1 * | 9/2009 | Kaushal | G05B 13/0265 |
| | | | 700/110 |

(Continued)

OTHER PUBLICATIONS

Zhao et al., "Radio Environment Map Enabled Situation-Aware Cognitive Radio Learning Algorithms", 2006 (Year: 2006).*

(Continued)

*Primary Examiner* — Ondrej C Vostal (57) ABSTRACT

A method and system of managing fixed line network elements. Data from disparate sources is received by a processing layer of a monitoring server via a wireline communication network. The intelligence layer determines whether a first node from the disparate nodes is new or pre-existing. Based on a determination by the intelligence layer whether a node is new or pre-existing, different static rules are applied to the received data from the first node. Contextual information is retrieved from the measurements megastore related to the first node. A root cause of a malfunction of the first node is determined. A notification is generated based on the root cause of the malfunction.

21 Claims, 5 Drawing Sheets

(56) References Cited

U.S. PATENT DOCUMENTS

| | | | |
|---|---|---|---|
| 2010/0023952 A1 | 1/2010 | Sandoval et al. | |
| 2012/0092154 A1 | 4/2012 | Petite | |
| 2014/0223016 A1* | 8/2014 | Varney | H04L 41/0893 709/226 |
| 2015/0280968 A1* | 10/2015 | Gates | G06F 11/0709 714/37 |
| 2015/0280969 A1* | 10/2015 | Gates | G06F 11/0709 714/37 |
| 2016/0021173 A1 | 1/2016 | Tapia | |
| 2016/0105338 A1* | 4/2016 | Fletcher | H04L 43/16 709/224 |
| 2016/0294606 A1* | 10/2016 | Puri | H04L 41/0695 |
| 2016/0327921 A1* | 11/2016 | Ribbich | F24F 11/30 |
| 2017/0093657 A1* | 3/2017 | Angus | H04L 43/065 |

OTHER PUBLICATIONS

International Search Report and Written Opinion for PCT Application No. PCT/US2017/037523 dated Feb. 6, 2018, 9 pages.

\* cited by examiner

FIXED LINE RESOURCE MANAGEMENT

CROSS REFERENCE TO RELATED PATENT APPLICATION

This application claims priority to U.S. Provisional Patent Application No. 62/350,115, filed on Jun. 14, 2016, entitled "Fixed Line Resource Management," which is hereby incorporated by reference in its entirety.

BACKGROUND

Presently, there is a revolution with the advent of big data techniques. Where prior data storage technologies, such as relational databases, were not sufficiently performant for large amounts of data, the advent of alternative data stores, based in the cloud, along with parallel processing algorithms, such as map-reduce, have made big data practical, performant, and cost effective. Furthermore, there have been recent advances in performant processing on large amounts of data to allow for real-time (or near-real time) analysis of data. One example includes Spark which provides such processing on Hadoop and leverages in-memory computation.

Big data and machine learning techniques, may be applied to a wide array of domains. One example is wireline communication networks, which have experienced constant and significant transformation, guided by the continuous development of new network technologies and services for customer provided equipment (CPE), such as modems, telephones, routers, switches, residential gateways, home networking adapters, and internet access gateways. Such CPE's typically support telephone, internet, television (TV) service, and/or other popular consumer data services.

Wireline service providers have continuously evolved to cope with the increasing traffic demands, as well as the performance requirements imposed by these wireline applications. In one aspect, the CPEs and/or their supporting network concentration nodes are frequently upgraded in hardware and/or software to accommodate the increasing demand in data. In some instances CPEs are introduced in new areas. Installation of these CPEs and their supporting concentration nodes, collectively referred to herein as "nodes," creates a formidable operational challenge for wireline network operators that need to grow their systems in a sustainable way.

This creates a tremendous operational challenge for network operators that need to grow their systems in a sustainable way and maintain the healthy operation of every node. In existing systems, when a customer experiences a malfunction with their CPE, the customer first must call and explain the symptoms to a customer care representative, who classifies the matter based on predetermined criteria. An internal record may be generated to be analyzed by an appropriately skilled engineer. An engineer may create a Call Reliability Report (CRR) that includes the traffic volume, number of dropped calls, reasons for the dropped calls, and an overall calculated drop call rate for the node(s) of concern. In some cases, there is an intermediate engineering triaging group that may address some of the complaints, while in other cases, the case is sent to a field engineer to investigate the root of the malfunction. Due to the complexity of present wireline systems, the field engineer may investigate multiple systems to determine what the cause of the malfunction may be based on the limited analysis that s/he could perform from the local (i.e., node) knowledge of the network.

The challenges of the engineer are further exacerbated by the fact that in today's wireline networks, there are an increasing number of data sources with a substantial amount of performance data that is collected from each node, which is often aggregated in time intervals such as minutes, hours, days, etc. Together the data provides key performance indicators (KPIs), which are reviewed by engineers to better understand the overall health of the wireline network, detect problematic situations, and decide when it is time to upgrade part of the network. Furthermore, in existing systems it is difficult to aggregate data from disparate nodes, particularly if they are of different nature. For example, a report from a CPE (e.g., in the form of a set-top box) indicating frequent resets at a home location is not easy to combine with the CPU temperature of a concentration node in its critical path. Such specialized report requires significant processing and therefore may not be immediately available to the engineer. Once the data is made available, the engineer must still manually analyze the large volume of data, which is not only inefficient but may also be incomplete because an engineer may not be able to effectively discern trends from multiple data sources. Further, a distinction is not made between an existing node and a new node to assure a robust installation. The result is typically a sub-optimal wireline network performance and a poor customer experience. It is with respect to these considerations and others that the present disclosure has been written.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

This disclosure generally relates to methods and systems of managing fixed line network elements. A scalable network backend is provided based on an open architecture that provides simplified access to data and increases automation. The operational efficiency and the overall cost of operation of the network is reduced by automation of functions and rationalization of hardware and software resources. The use of big data technologies, complemented with machine learning approaches, simplify and automate complex tasks, resulting in a more efficient wireline network operation, improved customer quality, and reduced subscriber churn.

In one aspect, the systems described herein provide an open platform where multiple data feeds from disparate wireline nodes are combined and processed in real time. In one embodiment, the system performs continuous monitoring and transmission of the monitored data from each network node, which can be synthesized at a remote server. The synthesized data harvested from disparate nodes is analyzed for potential malfunctions and relevant solutions are provided. In one aspect, a distinction is made between new nodes and existing nodes to assure a robust installation and to make the installation process as seamless as possible and to maintain the health of the wireline network as a whole.

Example System Architecture

Figure 1:
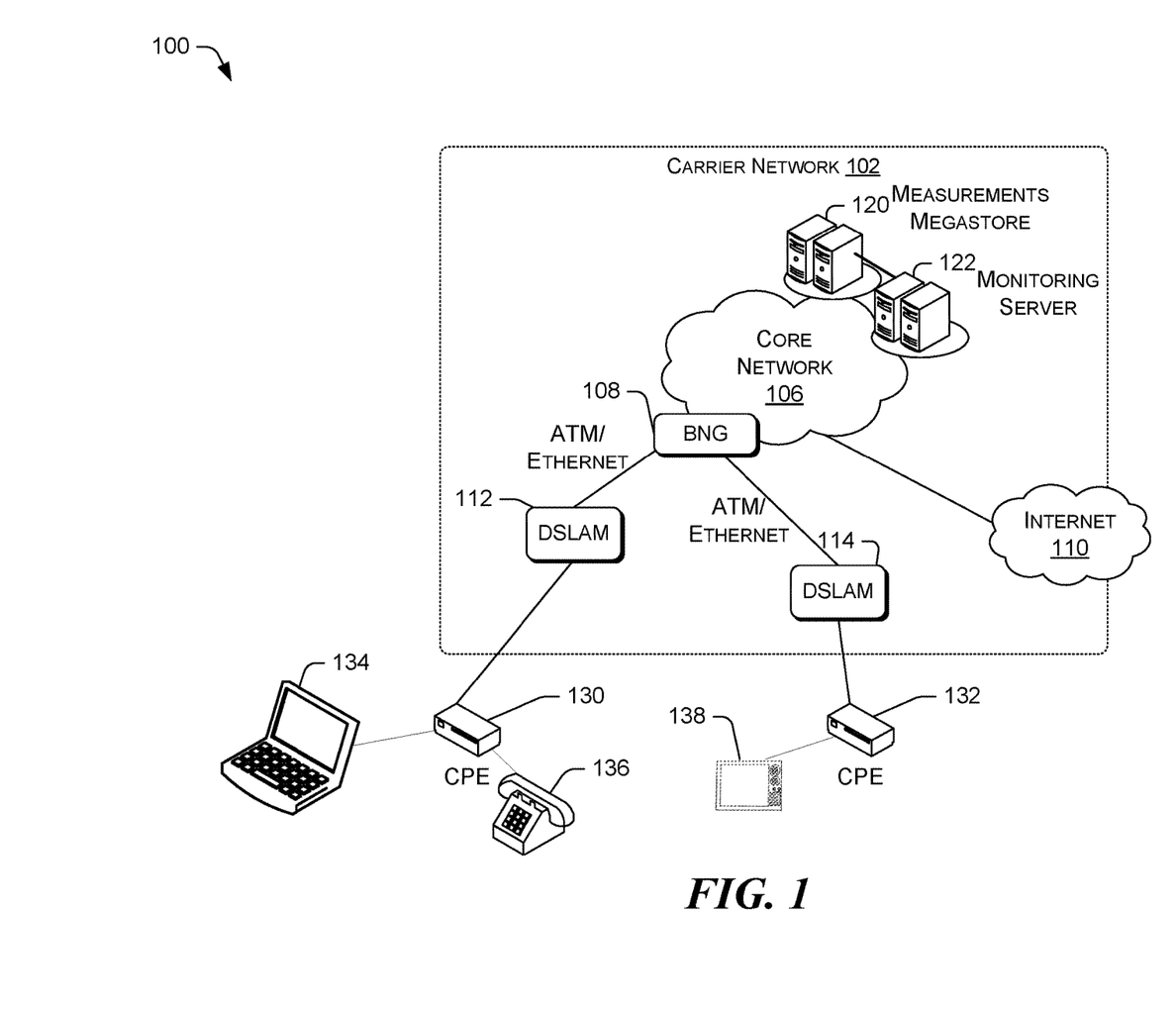
FIG. 1 illustrates an example network architecture for implementing a fixed line resource management architecture.

FIG. 1 illustrates an example network architecture for implementing a fixed line resource management architecture. The network architecture 100 may include a carrier network 102 that is provided by a telecommunication local exchange carrier (LEC) to provide a wide range of communication services and ancillary services or features to its subscriber customers and associated customer premises equipment (CPE) users. The elements generally indicated by the reference numeral 100 are elements of the wireline network architecture for digital data services and are operated by or on behalf of the LEC. The system 100 provides communications for various user equipment (UE) such as 134, 136, and 138.

For purposes of later discussion, several UE's appear in the drawing, to represent some examples of the devices that may receive various data communication services via the carrier network 102. Today, some fixed line UE's typically take the form of tablet computers, personal digital assistants (PDAs), smart watches, televisions, telephones, and regular computers, although they may be implemented in other form factors, including consumer, business, and gaming electronic devices. The carrier network 102 allows users of the UE's (e.g., customers or subscribers) to receive information from, and send information to, various servers (e.g., 120 and 122), to private networks, and a public network, such as the Internet 110.

Although a single carrier network 102 is shown, the carrier network 102 may be implemented by a number of interconnected carrier networks 102. A carrier network 102 includes a core network 106, which is the central part of a wireline telecommunications network of the LEC that provides various services to customers who are connected by the carrier network 102. For example, the core network may route telephone calls across the public switched telephone network (PSTN). Typical devices and facilities included in the core network 106 are switches and routers. Some typical functions performed by the core network 106 is aggregation, call control/switching, authentication, usage calculation, etc. Further, the core network 106 may provide a gateway to the internet 110. Accordingly, the core network 106 provides subscribers with access to data and technology resources.

For a LEC, communication services, such as telephone, television (TV), and/or internet, may be provided to a subscriber using a combination of optical fiber and digital subscriber line (DSL) technologies to the residence. For example, fiber communication may be used over long distances and a digital subscriber line (DSL) over an existing plain old telephone service (POTS) twisted pair cable as last mile access to the subscriber's home. Cable LECs may use a similar architecture, to provide digital services, such as broadband to a subscriber home, but may use the available coaxial cable (instead of a twisted pair) for the last mile transmission standard. It will be understood that a subscriber "home" can be in a residential environment, multi-dwelling units, or even in business offices.

At the home of the customer, there is CPE 130, 132, which is connected with the LEC's equipment via the core network 106. CPEs may take various forms, such as a modem, telephone, router, switch, residential gateway, home networking adapter, and internet access gateway, which enable the customer to access LEC's network 102.

In the example of FIG. 1 the CPEs 130 and 132 are connected to the core network 106 through concentration nodes. The concentration nodes include a digital subscriber line access multiplexer (DSLAM) unit (e.g., 112, 114) that collects from multiple modem ports and aggregates data/voice traffic into a composite signal via multiplexing. The aggregated traffic is then directed to the LEC's backbone switch via the carrier network 102.

The DSLAM (e.g., 112, 114) does not reroute traffic between multiple IP networks. Rather, it routs traffic between carrier network 102 devices and user equipment connection points, such as 134 to 136. The DSLAM traffic is switched to a broadband network gateway (BNG) 108, where the core network 106 may route the traffic to the internet 110 for content and communication. Accordingly, the CPE (e.g., 130, 132) can take advantage of enhanced telephone voice and data line signaling features as well as the optimization of the installation (e.g., initial setup) and ongoing operation of the nodes discussed herein.

For example, the DSLAM 112 may serve multiple data and voice customers within a neighborhood serving area interface. DSLAMs 112 may also be used by business, hotels, and other entities operating their own private telephone exchange.

Each DSLAM 112, 114 may also be viewed as a large collection of modems. Each modem in the collection of modems communicates with a single subscriber's DSL modem (e.g., a CPE 130, 132).

For example, each DSLAM's 130, 132 integrated DSL modems may be adjusted for optimum performance, such as bandwidth, power consumption, echoes, etc., to maintain the overall health of the network and provide good bandwidth efficiency.

Other individual elements such as switches and/or routers forming the core network 106 are omitted here for simplicity. As used herein, a network node may be a CPE or an element of the carrier network, such as a DSLAM (e.g., 112, 114) or BNG 108.

Packet communications via the carrier network 102 may support a variety of services from the telecommunication provider through the system 100, such as providing telephone, internet, and/or television (TV) service. In addition, the carrier network 102 may carry notifications that include instructions from the monitoring server 122 to various nodes of the network to optimize the performance thereof, as well as provide communications of multimedia, e-mail, web surfing or browsing, programming and media downloading (including audio and video), wireline phone services etc., to the UE's 134 to 136. For simplicity, the CPE and the components of the carrier network 102 are collectively referred herein as network nodes. In one aspect, each network node can communicate with the monitoring server 122 to provide data to and/or receive messages therefrom to optimize its control features.

In one embodiment, system 100 includes a measurements megastore server 120, which is coupled for communication via the core network 106. The measurements megastore server 120 stores contextual information (which may be based on data received from various network nodes) that is relevant to creating and maintaining a more efficient connection (e.g., reliability, signal quality, power consumption, and/or speed) thereof. Accordingly, each network element between a CPE (e.g., 130) and the core network 106 is adjusted not only during an initial setup but is also continuously monitored and adjusted during regular operation (e.g., after initial setup).

In various embodiments, the contextual information provided by the measurements megastore server 120 may include different types of information. For example, the measurements megastore server 120 may store contextual information comprising disparate data from various network nodes, such as CPE (130, 132), DSLAM (112, 114), BNG (108), etc., as well as relevant information from the World Wide Web (Web). In one embodiment, the measurements megastore 120 includes data from nodes related to one or more other carrier networks 102. The information from the measurements megastore 120 can be used by the monitoring server 122 to determine key performance indicators (KPIs) of the respective network nodes to provide a tailored optimization thereof and to provide relevant notifications. Accordingly, the monitoring server 122 is configured to receive performance information from network nodes (e.g., 130, 132, 112, 114, 108, etc.) and analyze the received data in view of predetermined static rules and the retrieved contextual information from the measurements megastore 120. The measurements megastore 120 includes information from the entire system 100, which may include many (e.g., millions) of CPE, DSLAM, and BNG nodes associated with carrier network 102, as well as other carrier networks (not shown).

The monitoring server 122 is configured to analyze the performance information received from each network node individually and together with the contextual information from disparate network nodes related to the network element, to determine whether one or more predetermined conditions are met, thereby determining whether the particular network element is not functioning properly. If a malfunction is detected, the contextual information may be used to determine whether other nodes in the path may be responsible for the malfunction of another node.

For example, if CPE 130 is deemed to be not functioning properly based on the performance information received by the monitoring server 122 from the CPE 130, the server 122 may perform additional analysis to determine whether CPE 130 is truly at fault or DSLAM 112 and/or BNG 108 are the actual or contributing sources of the malfunction. To that end, in various embodiments, the monitoring server 122 may analyze the performance information of the DSLAM 112 and BNG 108 provided by the measurements megastore 120. In various embodiments, the performance information may be based on the latest data or historic data to determine trends and extrapolate therefrom.

Upon determining the source of the malfunction, a notification can be triggered to the responsible network node (e.g., CPE 130, DSLAM 112, and/or BNG 108) to optimize its performance in the context of the entire system 100. Accordingly, in contrast to prior art wireline communication networks that only monitor performance metrics from a local node individually, the system described herein has the benefit of not only determining whether a local node is malfunctioning, but also identifying the true source of the malfunction and possibly also automatically curing the malfunction. For example, the monitoring server 122 may determine that another node that is in the critical path of the node in question may be the source of the malfunction.

Further, if a malfunction is deemed by the monitoring server to affect a similarly situated node (e.g., if DSLAM 112 is malfunctioning), proactive action may be taken with regard to DSLAM 114 in addition to sending a message with the corrective action to DSLAM 112 (i.e., by the monitoring server 122).

Accordingly, in one aspect, the system described herein allows the sharing of information from multiple platforms (e.g., different types of nodes such as a CPE 130, 132, DSLAM 112, 114, and BNG 108), which improves the probability of successfully identifying one or more sources of a malfunction and to find the proper remedy.

The monitoring server 122 and the measurements megastore 120 may be implemented in a distributed fashion on a number of similar platforms, to distribute the processing load and/or to provide additional functionality. In this regard, the system 100 provides an open platform where multiple data feeds from various nodes, which may be disparate platforms, can be combined and processed in real time, for millions nodes. Thus, the functionality described herein with respect to each of the servers 120 and 122 can also be provided by one or multiple different servers. The actual operation of the system 100 is described by way of example later.

Fixed Line Resource Management Architecture

Figure 2:
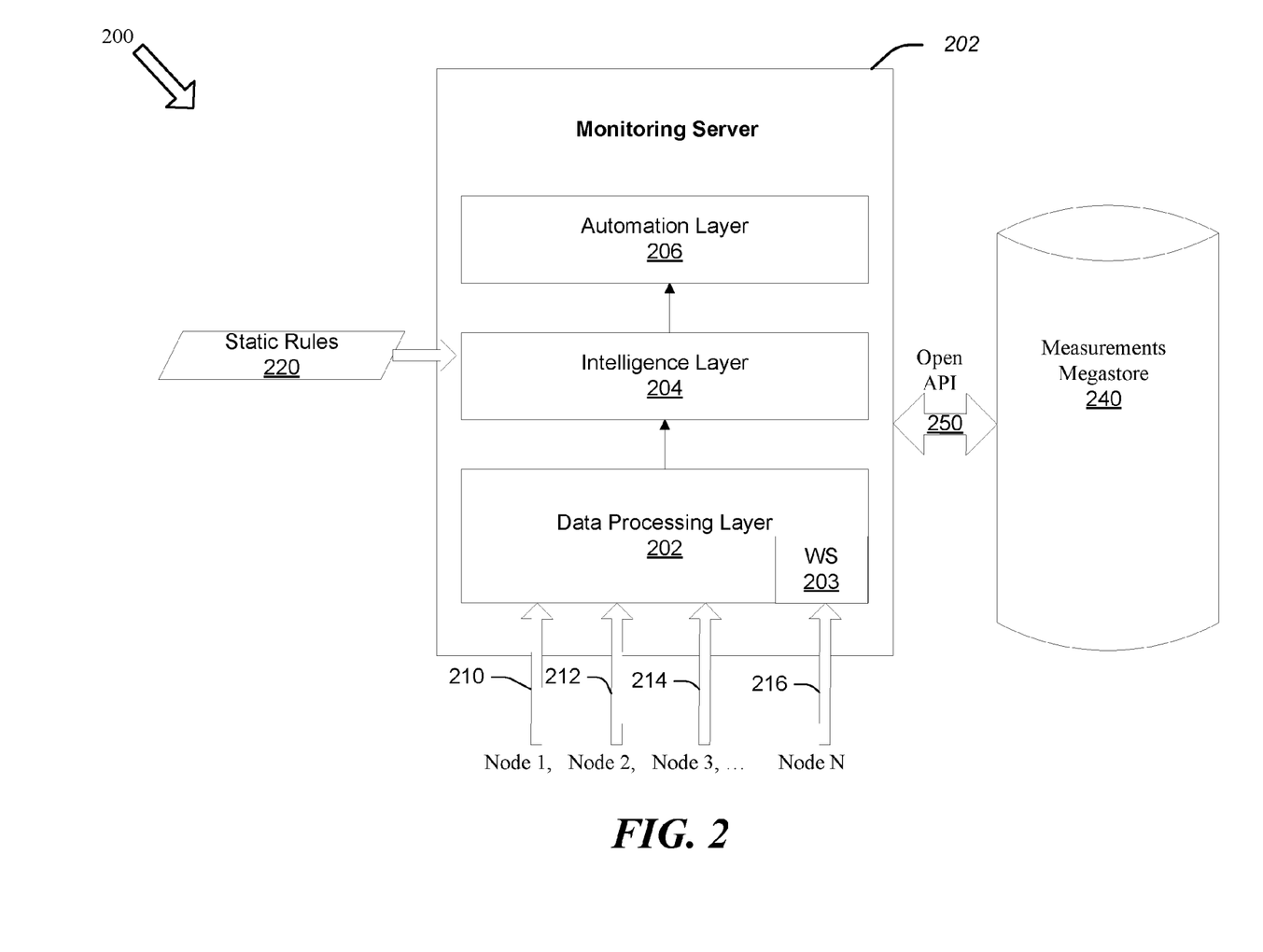
FIG. 2 is an example high level block diagram of a data framework of a fixed line resource management system.

FIG. 2 is a block diagram of a data framework of a fixed line resource management system 200, consistent with an exemplary embodiment. System 200 includes a monitoring server 202 that is coupled to a measurements megastore 240 via an open Application Program Interface (API) 230. The monitoring server 202 may have a data framework that includes a data processing layer 208, an intelligence layer 206, and an automation layer 204.

In one embodiment, the data framework in system 200 uses massive parallel processing methods to gather data from a plurality of (e.g., disparate) network nodes 1 to N (210 to 216). To facilitate the present discussion, the data processing layer 202, the intelligence layer 204, and the automation layer 206 are illustrated as being separate from the measurements megastore 240. However, it will be understood that, in various embodiments, these the functions may be combined on a single platform (i.e., a single monitoring server that includes the functions of the measurements megastore 240.) In one embodiment, to accommodate the real-time and large volume of information that is being generated by many (e.g., millions) of wireline network nodes, the measurements megastore 120 uses a massive parallel processing technology such as Hadoop, Storm, or Spark.

The data processing layer 202 is configured to receive data from many network nodes 210 to 216, which may be in the millions. As discussed above, a network node may be a CPE, DSLAM, BNG, or other element of the carrier network 102. The type of data received by the data processing layer 202 may include line quality parameters, such as signal to noise ratio (SNR), number of dropped uplink and/or downlink requests, throughput, volume of traffic, condition of the MOS, round trip delay time (RTT), traffic pattern, bottlenecks at the concentration node, the number of modem resets, etc. In addition, identification information of the node, such as the identification number of the CPE or modem, as well as the software version may be included. In one embodiment, the data processing layer 202 may also receive information from the Web that is relevant to the nodes of the system 200, such as weather and event information (e.g., natural disaster, football game in the vicinity, etc.). The data gathering of the data processing layer 202 may be performed in real time and/or in batch. The monitoring may be performed continuously, 24 hours a day, 7 days a week, at predetermined intervals, and/or in response to a trigger from the intelligence layer 204 of the monitoring system 200.

To that end the data processing layer may include a workflow scheduler (WS) 203 that checks for available data from the various nodes 210 to 216 and stores the data in the measurements megastore 240. The WS may also control the data retention period of the raw information from the node stored in the measurements megastore 240 and what is to happen with the data when the retention period expires (e.g., delete the data, move it to a different location, etc.).

In one embodiment, the data processing layer 202 performs basic data integrity tests to verify that the content of the received node performance data is not corrupt before storing the data in the measurements megastore 240. Upon determining that the data is valid, the data processing layer can perform predefined calculations to extract various KPI's from the node data. The KPI definitions may be configurable and incorporated to the monitoring server 202 in the form of a configuration text file. The KPIs may be calculated and aggregated on different dimensions depending on the carrier network architecture 102. KPIs may also be calculated differently for peak and busy time periods.

The intelligence layer 204 is configured to receive the information from the data processing layer 202 as well as static pattern detection rules 220 that may be preprogrammed in the intelligence layer 204. In addition, the intelligence layer may also develop complex rules based on the contextual information obtained by the measurements megastore 240. In one embodiment, the static rules 220 may be originally programmed by expert professionals, based on prior knowledge. The static rules 220 may be different for nodes that have been identified by the intelligence layer to be new versus previously existing. In one embodiment, complex rules are applied only to data obtained from nodes that have been deemed to be previously existing.

In various embodiments and depending on the node analyzed by the intelligence layer 204, the static rules may include determining whether a node (e.g., CPE) is active. For example, an existing node may be provisioned but not turned ON. The static rules may identify the volume of traffic received and generated by a node within a predetermined period. If the volume is below a predetermined threshold, an alert may be generated. The static rules may detect if there is a line failure. For example, if the number of resets of a particular node exceeds a predetermined threshold, an alert is generated. Further, if the number of resets of similar nodes (e.g., similar hardware, software, etc.) in a predetermined region are experiencing a reset in a predetermined time period, an alert may be generated. The one or more alerts are later used by the automation layer 206 to create a notification to an appropriate recipient, which is discussed in more detail later.

The static rules may also determine whether the throughput of a node is low based on a threshold bitrate requirement. In one embodiment, intervals with low traffic volume are discarded. However if the traffic volume is within a predetermined range but the present throughput is low, an alert may be generated. The severity of the alert may be raised if the throughput is consistently low (e.g., below a predetermined threshold) while the volume is high (e.g., within or above a predetermined range).

The static rules may also evaluate additional parameters, such as the CPU load and the signal to noise ratio (SNR) of a node. If the SNR is below a predetermined threshold, an alarm is triggered by the intelligence layer 204. If the SNR is below a predetermined threshold while the distance to the concentration node is within a threshold distance, then the severity of the alert is raised to high priority. If the number of intervals where a cyclic redundancy check (CRC) exceeds a predetermined threshold, an alert is generated. If the line quality is below a predetermined threshold but the SNR is above a predetermined threshold, an alert may be generated indicating a CPE hardware failure. Similarly, if the bitrate is low but the CPU load is high, an alert may be generated indicating a CPE software failure.

In various embodiments, a node is considered new if it has not been used before, has been installed before but just recently activated, and/or has only been in use for a threshold time period (e.g., first day, week, etc.)

For example, first static rules may be used for a new node and second static rules may be used for a previously existing node. The first static rules (i.e., for a new node) may be more stringent than the second static rules (i.e., for an existing node). By applying a different standard (e.g., set of criteria) to a new node, additional attention to detail may be provided to assure a successful and reliable installation that may ultimately result in a better customer experience.

For example, if a node, such a CPE (e.g., in the form of a set top box for a TV) is not installed properly, the installation can result in a frail CPE interface for the UE coupled to the CPE, and may be prone to frequent future malfunctions and customer complaints. Thus, threshold criteria for quality parameters, such as SNR, number of dropped uplink and/or downlink requests, throughput, RTT, etc., may be more stringent for new nodes versus existing nodes. Further, the threshold criteria for notifying a network administrator is lowered.

The intelligence layer 204 of the monitoring server 202 can determine whether a node is new by the identification information included in the data received by the data processing layer from each node, respectively. The identification information may be correlated to the customer account information that may be stored in a customer relations server (not shown) coupled to the core network 106. In various embodiments, the customer relations server may be a separate server, or be part of the monitoring server 202, and/or the measurements megastore 240.

The intelligence layer 204 may also develop complex rules based on contextual information provided by the measurements megastore 240. In this regard, the intelligence layer 204 may identify KPIs and possible causes of malfunctions when undesirable events, such as dropped calls or poor bandwidth occur. The intelligence layer 204 automatically extracts relevant information from various nodes and data sources that is stored in the measurements megastore 240. For example, if a node (e.g., CPE) is deemed to be malfunctioning because one or more threshold criteria are not met (e.g., the SNR is below a predetermined threshold) in the static rules 220, the intelligence layer 204 of the monitoring server 202 may retrieve information related to the node (e.g., CPE) from the measurements megastore, which may include other devices having the same software, hardware, and/or are within a logical geographic region.

For example, if CPE 130 is under scrutiny, the intelligence layer may determine how other CPEs that have the same software, hardware, and or are in a similar geographic region are performing. In addition, other nodes that are in the critical path, such as DSLAM 112 and BNG 108 (and other similar nodes) may be evaluated to determine the true cause of the malfunction. For example, there may be a hurricane that is sweeping a geographic area, which may be affecting various DSLAMs in the path of the hurricane, or there may be a football game that is being held at a stadium. This contextual information is provided by the measurements megastore 240, which can be used by the intelligence layer 204 of the monitoring server 202 to extract patterns and trends therefrom to determine the root cause of the malfunction.

There are an unlimited number of patterns that the intelligence layer 204 may detect with the information provided by the measurements megastore 240 and the data harvested for the node by the data processing layer 202. For example, an area with a high churn rate may show that most of the subscribers are concentrated in a small geographical area. A sector experiencing degraded performance may indicate a high number of resets in a specific time period. A large number of customers who call customer care may show the number of calls that are being routed directly to voice mail to be exceeding a predetermined threshold limit. An area having a drop call rate that is within a predetermined threshold, may indicate a number of instances in which customers had to re-dial within a predetermined time, to exceed a threshold limit (which may indicate a poor call quality). A sector may indicate congestion despite carrying traffic that is below a threshold limit. A threshold number of customers may experience their wireline coverage shrink after a network upgrade. Of course, countless other scenarios are supported.

In contrast to prior art systems that are strictly limited to the performance data provided by a network node, the system described herein is configured to determine whether a node further down the stream is responsible for the malfunction by analyzing the contextual information from the measurements megastore 240. Thus, even though a node may not be meeting the static rules 220, the intelligence layer may still deem the same node not to be the root cause of the malfunction because another node in its critical path is not functioning properly and is therefore at least contributorily responsible.

In addition, there may be a self-learning feature of the intelligence layer 204 that operative to detect abnormal conditions without previous knowledge of that particular malfunction. The intelligence layer 204 may create one or more complex rules that change threshold criteria of successful operation of a node when a similar event is identified to have occurred based on the contextual information. For example, if a season finale of a popular show creates bottlenecks in another core network, the intelligence layer 204 may identify and learn from this phenomenon via the contextual information provided by the measurements megastore 240 and adjust the affected nodes of its core network accordingly and/or provide the proper notification(s) identifying the cause of the malfunction.

Regarding the complex rules, the intelligence layer 204 may include a probability tree that stores the probabilities of particular causes and/or events that may be the root cause of a network event such as a dropped call. The implementation of a probability tree is described in further detail later with respect to FIG. 3.

Accordingly, the intelligence layer 204 constantly sifts through the data from various nodes 210 to 216 to identify patterns and/or trends within the disparate data sources (i.e., nodes 210 to 216). In one embodiment, the intelligence layer 204 may include different intelligence models for different types of malfunctions. The intelligence layer 204 is configured to identify a probable cause of a malfunction as well as an estimation of accuracy (error) for the error detection. In one embodiment, the accuracy of the detection is based on the frequency of the occurrence of the error.

For example, the estimation of accuracy may be high when a wireline network node may be experiencing degraded performance (drops, access failures, etc.) in an area that has been identified by the intelligence layer 204, through the contextual information from the measurements megastore 240, to be undergoing maintenance or where there is a known bandwidth bottleneck. The intelligence layer 204 may further improve the accuracy by reviewing the customer trace and the node data received by the data processing layer 202. From the disparate sources of data, the intelligence layer 204 can identify whether the drop is due to interference, hardware failure, software failure, etc.

Thus, the intelligence layer 204 may identify an error based on static rules 220 (i.e., that may be different between new nodes and existing nodes), as well as complex rules based on contextual information obtained from the measurements megastore 240 through an open API 250.

The automation layer 206 may trigger an automatic response to an identified node error without having to rely on prior human processing of the raw data harvested from each node by the data processing layer 202. In one embodiment, the appropriate action for an identified malfunction is preprogrammed by a system administrator at the intelligence layer based on static rules. Alternatively or in addition, the appropriate action is dynamically determined by the intelligence layer based on the contextual information provided by the measurements megastore 240.

In one embodiment, a notification may be sent by the automation layer 206 to the node that has been identified as being the source of the malfunction or prophylactically to one or more similar nodes (e.g., having the same hardware, software, being in a similar location, etc.) to prevent a similar malfunction. Alternatively or in addition, the notification may be sent to an account holder related to the node via text message, e-mail, telephone, social media, etc. To that end, the notification may be in the form of a visual or audio alert that is provided on a user interface (e.g., display, asserted LED, speaker, haptic element, etc.) of the node and/or computing device of the account holder. In addition or alternatively, the notification may include instructions that may alter one or more settings of the recipient node for a corrective action.

The corrective action may be a resetting of a node, adjusting one or more parameters, or sending a note to an appropriately skilled engineer of the LEC with the identified wireline malfunction and potential solution. In other cases, the automated action may be to send a message to the subscriber, notifying them of the cause of the malfunction (e.g., there is ongoing maintenance work in the area), or providing an automatic credit to compensate for the degraded performance and notifying the subscriber of the same.

In one example, where multiple subscribers suffer a substantially similar malfunction in one area, the automation layer 206 may automatically send a notification to all subscribers in that area to prophylactically cure the malfunction before the subscribers are affected by the malfunction. Put differently upon determining that a group of other nodes having a similar platform (e.g., hardware, software, operating system, etc.) in an area of the first node meet a predetermined condition or exceed a predetermined threshold, a notification is automatically sent to other nodes having a similar platform in that group.

In one embodiment, node errors that are identified with an accuracy below a first threshold are treated differently from those with an accuracy of above a second threshold. In one embodiment, the first and second threshold have the same value. For example, if an error has been detected that is deemed to be of low accuracy, an automatic action may not be performed by the automation layer 206 until additional data is received to improve the accuracy and/or the subscriber calls about the malfunction. However, if the error is identified with a high accuracy, automatic immediate remedial measures are undertaken.

Figure 3:
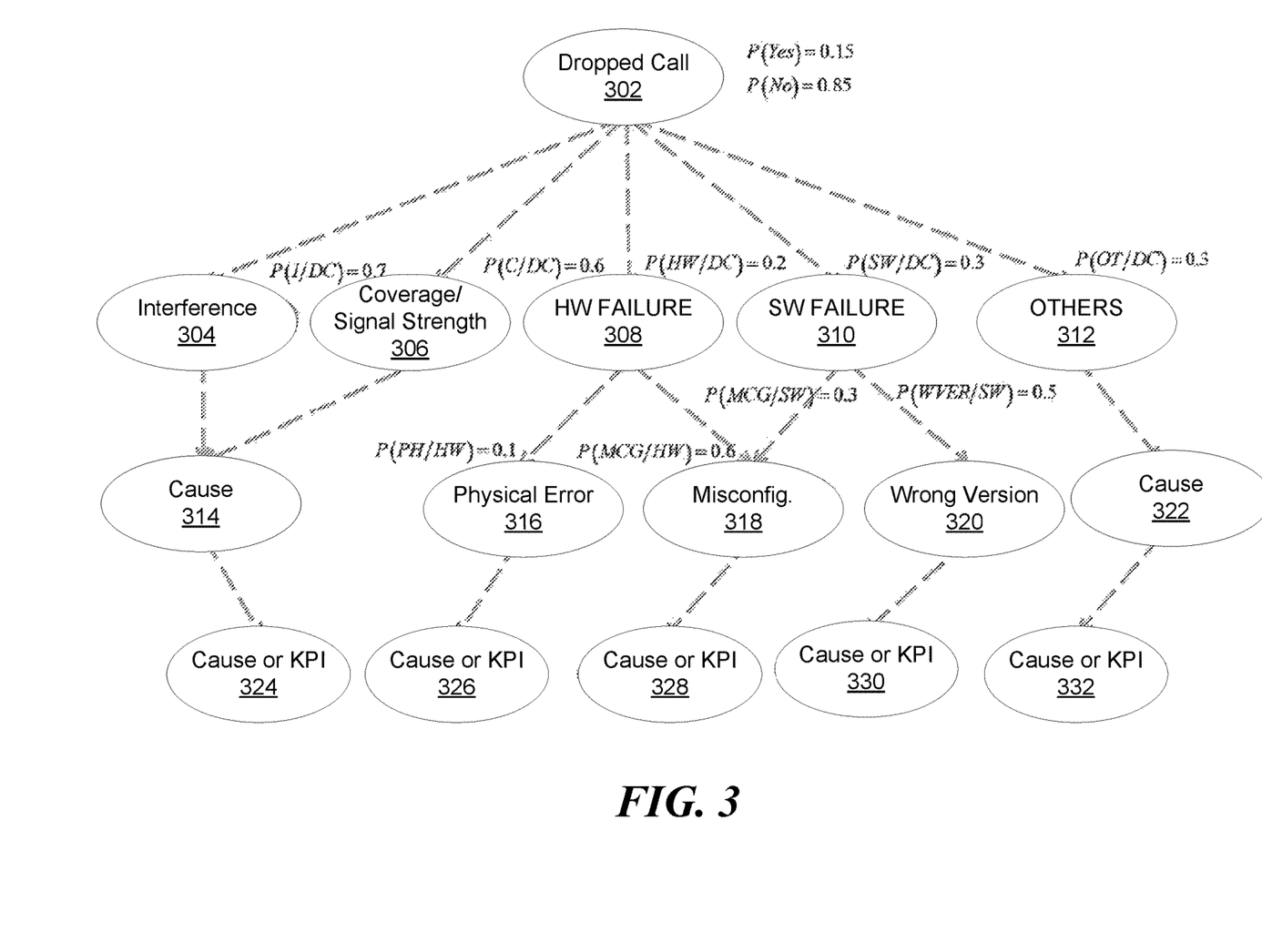
FIG. 3 illustrates an example model for a root cause identification.

FIG. 3 illustrates an example intelligence model for an automatic root cause identification of an error in a wireline system. Specifically, FIG. 3 illustrates a probability tree that stores information as to the probable root cause for a dropped wireline call 136 over a CPE 130, as illustrated in FIG. 1. Based on a large corpus of data, a machine learning algorithm can determine the probabilities that an event, such as a dropped call, was correlated to a particular cause. In turn, a particular cause, may have different potential causes of its own, each with their own probabilities. Eventually, the probability of a root cause, may be discerned.

In FIG. 3, a probability tree for a dropped call event 302 is illustrated. Starting at the top of this probability tree, every event is associated with a probability P(Event). For example the probability that a detected network event could be a dropped call is illustrated as P(Yes)=0.15 (or 15%). The probability that the detected wireline network event is some other event is P(No)=0.85.

The probability tree may then be traversed to determine the most likely root cause(s) of a node error. To do so, the probability tree is traversed to the probability nodules representing potential immediate causes for the dropped call event 302. These may include interference 304 from other systems, poor coverage/signal strength 306, hardware failure 308, software failure 310, or other failures 312. As with the dropped call event, each cause is associated with a probability. Because, these causes are potential causes, the probabilities are expressed as conditional probabilities P(Condition|Event). For example, the probability that a dropped call was caused by a hardware failure 308 is shown as P(HW|DC)=0.2. Similarly, the probability that a dropped call was caused by a software failure 310 is shown as P(SW|DC)=0.3.

Cause nodules may in turn have their own respective causes. For example, interference 304 and poor coverage/signal strength 306 may have the same cause 314. Hardware failure 308 may have different possible causes, here shown as a physical error 316 and misconfiguration of user equipment 318. Again, the each nodule is associated with a respective probability, and as potential causes, each probability is expressed as a conditional probability. Here the probability that a physical error in the hardware 316 caused a hardware failure is shown as P(PH|HW)=0.1. The probability that the hardware was misconfigured 318 caused the hardware failure is shown as P(MCG|HW)=0.6.

Note that a software failure 310 may also be caused by misconfiguration 318. Even though the probability tree traverses to a nodule also traversable from hardware failure 308, the misconfiguration nodule 318 has its own probability as the cause of a software failure 310 as shown as P(MCG|SW)=0.3. A software failure 310 may also be caused by having a wrong version of software installed 320, with a causal conditional probability of P(WVER|SW)=0.5. Similarly, other causes 312, may have their own respective causes 322.

A probability tree is generally populated via receiving a statistically significant corpus of data. The data is then applied to the probability tree to compute the probabilities in the probability tree.

When performing a diagnosis, the probability tree starts with the causes and/or KPI leaf nodules 324, 326, 328, 330, 332. Depending on the network data observed, the probabilities of the causes and/or KPI leaf nodules 324, 326, 328, 330, 332 are updated. For example, if a misconfiguration is actually observed, the probability of the misconfiguration 328 is changed to 100%. If a cause 324 is not observed, that probability is changed to 0%. Probabilities need not be binary, i.e. solely 100% or 0%. Intermediate (non 0% non 100%) probabilities may be computed based on a sampling or running average of data.

In one embodiment, once the causes and/or KPI leaf nodules 324, 326, 328, 330, 332 are updated, the parent nodule probabilities are updated according to Bayes Algorithm. Thus the conditional probabilities of the parent nodules 314, 316, 318, 320 and 322 are updated using the child nodule as a determination as to whether a condition was satisfied. The probabilities of the parent nodules 314, 316, 318, 320 and 322 are then updated. This process is repeated for the level of parent nodules above, until the root nodule 302 is reached. At this point, all the probabilities in the probability tree have been updated in light of the observed causes and/or KPIs 324, 326, 328, 330, and 332.

Potential root causes of the root nodule, the dropped call, 302 will be surfaced to a user by selecting all child nodules with updated probabilities exceeding a predetermined threshold.

After finishing analysis, the probability tree is returned to its original state and original probabilities.

However, over time the historical data may be collected. Upon agreement by an administrator, at least a subset of the historical data may be applied to the probability tree to permanently update the probabilities in the probability tree. Subsequent analyses may then use the updated probability tree. In this way, the probability tree learns from historical data.

It is to be emphasized that this particular approach in machine learning is but one option. Other well-known options include entropy based trees and naïve-Bayesian trees. One advantage peculiar to a Bayesian based tree is that the domain of causes and/or KPIs may be partitioned into sub-domains without forcing re-computation of the probabilities. Accordingly, a probability tree may be partitioned for different subsets of the network as desired by the administrator.

Example Process

Figure 4:
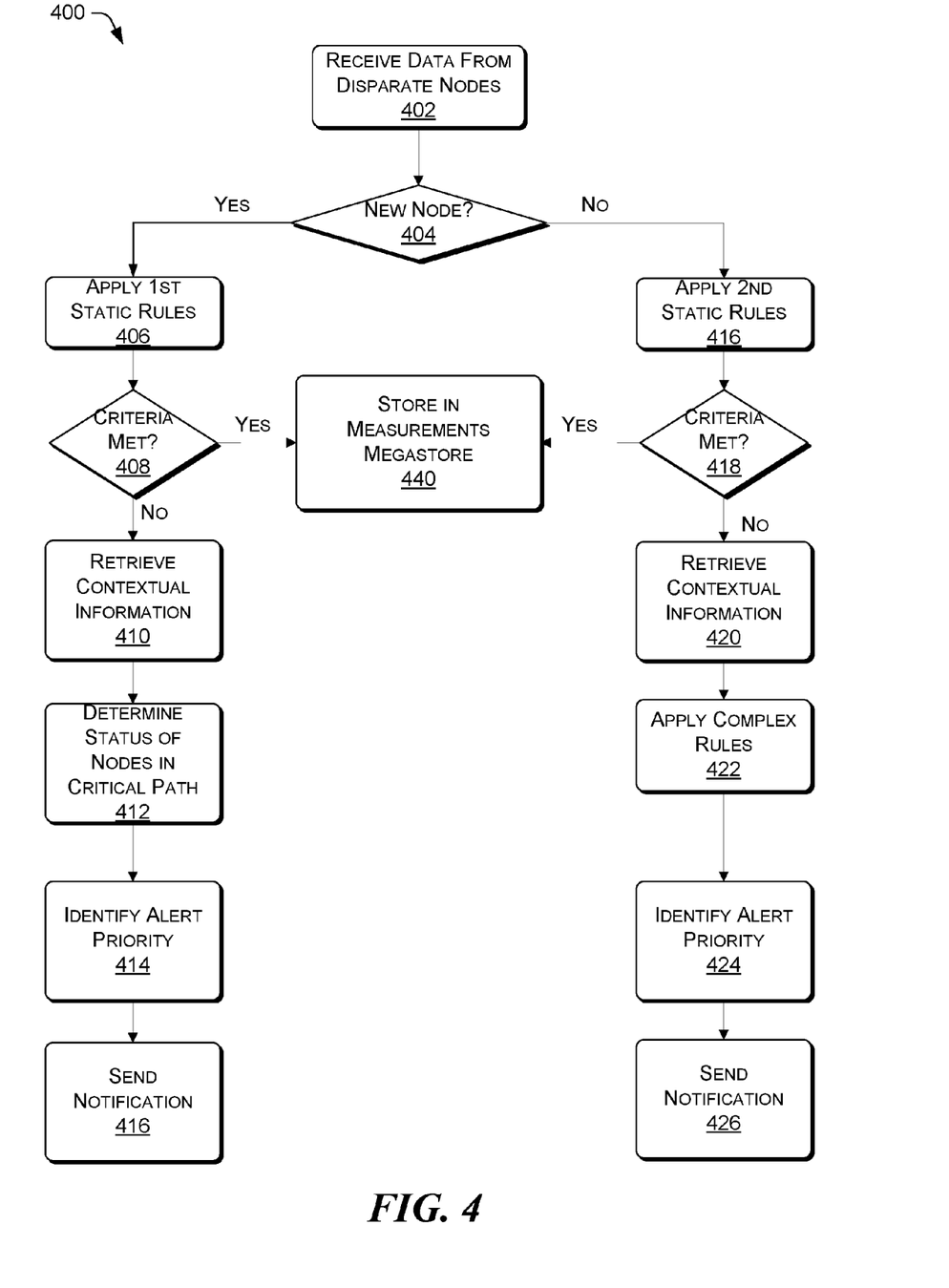
FIG. 4 is a flow diagram of an example process for fixed wire line node management.

With the foregoing overview of the system, it may be helpful now to consider a high-level discussion of an example process. To that end, FIG. 4 illustrates a high level process for a fixed line node management. The process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 400 is described with reference to the architecture 100 of FIG. 1.

At block 402, data is received from disparate nodes by the monitoring server 122. The disparate nodes may include CPEs 130, 132, DSLAMs 112, 114, BNGs 108, and other elements of the wireline carrier network 102 that are configured to provide their status information to the monitoring server at predetermined time intervals or upon request from the monitoring server. In various embodiments, the data from each node may be pushed to the monitoring server 122 automatically or pulled from the monitoring server 122. The type of data received may include, but is not limited to, line quality parameters, such as SNR, dropped uplink/downlink requests, throughput, volume of traffic, hardware condition, RTT, traffic patterns, bottlenecks at the concentration nodes, number of modem resets, and the like. In addition, the data from each node may include a time stamp and identification information of the node, such as the identification number of the CPE or modem, as well as the software version. This data may be received by a processing layer of the monitoring server 122, which is capable of accommodating millions of nodes.

As discussed previously, in one embodiment, the processing layer of the monitoring server 122 performs an integrity test to determine whether the data received from each node is valid. Data that is deemed to be not reliable is discarded. The remaining data is stored in the measurements megastore 120.

At block 404, for each node that has provided data, the intelligence layer of the monitoring server 122 determines whether the node new based on the identification information included in the data received from each node, respectively. If the node is new ("yes" at decision block 404), the process continues with step 406. However, if the node is an existing one ("no" at decision block 404), the process continues with step 416. For discussion purposes, it will be assumed that the node in question is a CPE 130, in the form of a modem.

At block 406, upon determining that the node is new, first static rules are applied to the data received from the node in question. The first static rules may be different for each platform of node (e.g., CPE, DSLAM, BNG, etc.). The intelligence layer of the monitoring server 122 may determine the platform (e.g., type of node) from the identification information in the data received from the node in question. In one embodiment, the first static rules for each type of new node is more elaborate (e.g., more thorough in that more quality parameters are evaluated) and more stringent (in that it has more demanding thresholds) than the corresponding static rules (i.e., second static rules) for a corresponding existing node of the same platform. For example, for a new CPE 130, a threshold criteria may be an SNR of >30 dB, whereas for an existing CPE, the threshold criteria may be an SNR of >25 dB.

At block 408, the intelligence layer of the monitoring server 122 determines whether the criteria based on the first static rules are met. If the criteria are met, ("yes" at decision block 408), the node is deemed to be functional and properly installed, and the conclusion is stored in the measurements megastore 120 (i.e., step 440). This stored information may later be provided as part of the contextual information to the monitoring server upon request through an open API.

However, if the criteria are not met, ("no" at decision block 408) the process continues with block 410, where contextual information related to the node in question is retrieved from the measurements megastore 120. In this example, relevant information may include the status of other nodes in the critical path of the CPE 130, such as DSLAM 112, BNG 108, as well as aggregated CPE statistics on other devices (i.e., nodes) having substantially similar software, hardware, and/or nodes that are within a logical geographic region.

At block 412, the intelligence layer of the monitoring server 122 may develop complex rules based at least in part by the contextual information retrieved from the measurements megastore 120. For example, the intelligence layer of the monitoring server 122 may determine whether a node in its critical path is malfunctioning.

At block 414, the alert priority is determined by the automation layer 206 of the monitoring server 122. The priority of an alert is based on several factors, which may include severity, frequency, and platform of node affected. In one embodiment, new nodes are given higher priority to assure that the customer needs are addressed with a sense of urgency to assure excellent customer service. In one example, an alert is of low priority if the number of occurrences is below a predetermined threshold for the same and/or similar nodes (depending on the type of alert). However, even if the number of occurrences of an event is low, it may be deemed of high priority if the malfunction is of serious type. For example, if there are more than three resets on a node (e.g., CPE 130) within predetermined period (e.g., 1 day) for the same node, the alert is deemed to be serious. Further, if the number of similar nodes (e.g., CPEs sharing the same type of hardware and software) exceed a predetermined threshold (e.g., 100 CPE's in a region experience a reset) in a predetermined period (e.g., 1 day), the alert is deemed to be of high priority.

At block 416, a notification is sent by an automation layer 206 to an appropriate recipient. In various scenarios, the appropriate recipient may be the node in question itself, an account holder related to the node in question, and/or an engineer associated with the wireline LEC.

As discussed above, in various embodiments, the notification may be sent via text message, e-mail, telephone, social media, etc. The notification may be an alert that is provided on a user interface of a node or computing device of an appropriate recipient (e.g., display, LED, speaker, haptic element etc.) and/or may include instructions for corrective action such that the respective nodes are automatically cured upon receiving the notification. Put differently, the notification may include instructions that are operative to automatically cure the malfunction at the receiving node.

Going back to block 404, upon determining that the node is an existing one ("no" at decision block 404), the process continues with block 416. Blocks 416 to 426 are similar to corresponding blocks 406 to 414, discussed above and are therefore not discussed in detail below for brevity. However, it is to be appreciated that blocks 416 to 426 have been drawn in a separate path to emphasize that rules and criteria used for an existing node are different from those of a new node.

At block 416, upon determining that the node is new, second static rules are applied to the data received from the node in question. In one embodiment, the second static rules for each type of node are less elaborate and less stringent than the corresponding first static rules for a new node of the same type.

At block 418, the intelligence layer of the monitoring server 122 determines whether the criteria based on the second static rules are met. If the criteria are met, ("yes" at decision block 418), the node is deemed to be functional and the conclusion is stored in the measurements megastore 120 (i.e., step 440). This stored information may later be provided as part of the contextual information to the monitoring server 120 upon request by the monitoring server through an open API.

However, if the criteria are not met, ("no" at decision block 418) the process continues with block 420, where contextual information related to the node in question is retrieved from the measurements megastore 120. Since the node in question (i.e., CPE 130) is determined to be previously existing (i.e., not new), historical data in the form of patterns and trends of the existing node, as well as similar other nodes, can be determined via the contextual information stored in the measurements megastore 120. In this example, relevant information may include the status of other nodes in the critical path of the CPE 130, such as DSLAM 112, BNG 108, as well as aggregated CPE statistics on other devices (i.e., nodes) having substantially similar software, hardware, and/or nodes that are within a logical geographic region.

At block 422, the intelligence layer of the monitoring server 122 may develop complex rules based at least in part on the contextual information retrieved from the measurements megastore 120. For example, the intelligence layer of the monitoring server 122 may determine whether one or more nodes in its critical path is/are presently malfunctioning and develop historical patterns and trends and extrapolate therefrom.

At block 424, a notification is sent by an automation layer 206 to an appropriate recipient. In various scenarios, the appropriate recipient may be the node in question itself, another node that is deemed to be defective that is in the critical path of the node in question, an account holder related to the node in question, an engineer associated with the wireline LEC, and/or other similar active nodes to prophylactically cure the malfunction before the respective nodes are affected by the malfunction affecting the node in question. In one embodiment, the threshold for sending a notification to the engineer associated with the wireline LEC is higher (i.e., less likely) for an existing node than the threshold for a new node.

Example Use Cases

The fixed line resource management system 200 may be used to continuously monitor and manage various wireline networks. For example, one of such wireline networks is a broadband internet network. For such a network, the fixed line resource management system 200 may receive device reports from UEs and CPEs that reside at the service locations of the end users. Such device reports may include line quality reports, type of transfer reports (e.g., voice and/or data transfers), and hardware status reports. Accordingly, the fixed line management system 200 may combine these device reports with network information that includes network alerts, network KPIs, network topology information, and/or additional data collected from the web. For example, the network information may be in the form of fiber-to-the home (FTTH) network alarms, FTTH and WiMax trouble tickets, circuit configuration information for FTTH end user UE, and/or customer billing information of the end users. In some instances, the additional data may include deep packet inspection (DPI) data that are collected by network traffic monitoring systems and tools, which may provide additional real user experience data unavailable from other data sources.

Accordingly, the fixed line management system 200 may use the one or more sources of data to determine the most probable root cause of the service outage problems experienced by one or more end users. For instance, the fixed line management system 220 may perform interference detection by treating UE in the form of set top boxes that are located in a geographical area as spectrum analyzers. In such an instance, a high frame error rate in a communication channel for the set top boxes may indicates a high spectrum interference in the geographical area. Once the probable root cause is identified, the fixed line management system 200 may apply an action to resolve the root cause. For example, the action may be to automatically reset a UE or a CPE, automatically generate an open engineering ticket, and/or so forth.

Additionally, the fixed line management system 200 may analyze the combined data to generate trends and identify problems affecting specific area or network elements Such analysis may also identify alarm situations in the CPEs and/or aggregation nodes that assist in the resolution of customer complaints. Further, by analyzing the additional network performance data and CPE performance data, the fixed line management system 200 may identify performance issues that are unrelated to alarms, but which may potentially lead to a customer complaint. Such analysis may also lead to faster problem resolution time by analyzing all possible failure angles. In this way, areas serviced by the broadband internet network with poor user experience may be identified and the root causes resolved.

The fixed line management system 200 may provide user interface screens that show visualizations of various received and generated data related the broadband internet network. In one example, a visualization on a user interface screen may be an overview interface that shows a geographical overview of an area. For the area, the overview interface may show KPIs that are aggregated by state, municipalities, or zip code, depending on zoom level. The visualization may show alarm and trouble ticket trends for the area over a selected time period. Another user interface screen may be a CPE selection view that enable a viewer to select a geographical area (e.g., a zip code) to show all end users in an area, in which network nodes that correspond to the end user and/or the geographical area may be colored coded based on various KPIs. Such visualization may enable the viewer to quickly spot end users that are experiencing problems in the geographical area.

An additional user interface screen may be a customer trouble ticket investigation view that enables a viewer to select an end user to view various alarms that are associated with the UE of the end user. The user interface screen may include controls for selecting filters that facilitate investigate by parameters such as concentration node identifier, symptom, problem severity, and/or so forth. The user interface screen may further display a high level overview of health for UE that belong to the end user and the concentration nodes along a service path, and/or details on the number of alarms affecting an end user.

In another example, a user interface screen in the form of a customer overview may provide a summary of services contracted by the end user and the payment history of the end user. For example, the summary may include billing dates, service packages provided, and amount of service charge billed. The customer overview may also provide historical information of alarms associated with the UE of the end user, as well summarized information pertaining to customer complaints. The historical information may include dates of alarms, the type of alarm, the severity rating of the alarms, and the resolution status. The summarized information may include trouble ticket details, such as the creation date of a trouble ticket, the time and date of the reported symptom, the affected node, and/or identifier of the technician assigned to resolve the trouble ticket.

In an additional example, a user interface screen in the form of a customer alarm investigation view may show a first list of alarms that correspond to a customer complaint of the end user, and/or a second list of alarms that appeared in a predetermined time period after the complaint. For example, the first list may show that the end user complained after an alarm "BIP threshold exceeded and ONU disabled"

regarding the UE of the end user was triggered in two consecutive days. The second list may show that that the UE of the end user also had an "RX power out of range and ONU not disabled" alarm for several days after the complaint.

Another example user interface screen provided by the fixed line management system 200 in the form of a node alarm investigation view may facilitate investigation of alarms at a network level or a node level. For instance, an alarm trend display of the node alarm investigation view may show that alarms peaked on a particular date. Correspondingly, a trouble ticket trend display may show a peak of customer complaints on the particular date, which may indicate that the peak of customer complaints may be related to the alarm peak. The node alarm investigation view may further display a top offender view for nodes in the broadband internet network. The top offender view may show that a particular node e.g., "node MEX439MXK03," is exhibiting abnormal behavior. A further filtering of alarms for that particular node may indicate elevated instances of a particular alarm (e.g., RX_PWR_ERROR_ONU_NOT_DSA" on the particular date.

Example Computer Platform

As shown by the above discussion, functions for storing contextual information, monitoring wireline network nodes, identifying whether a node is new or previously existing, determining a root case of a node error, providing notifications, and other functions, can be implemented on computers connected for data communication via the network elements of the carrier network 102, operating as the measurements megastore 120, monitoring server 120, CPE 130, and components (e.g., nodes) of the carrier network 102, as shown in FIG. 1. Although special purpose devices may be used, such devices also may be implemented using one or more hardware platforms intended to represent a general class of data processing device commonly used to run "server" programming so as to implement functions such as receiving data from disparate sources, retrieving contextual information, analyzing information for determining whether a predetermined condition is met or a predetermined threshold is exceeded, and providing notifications, as discussed above, albeit with an appropriate network connection for data communication.

Figure 5:
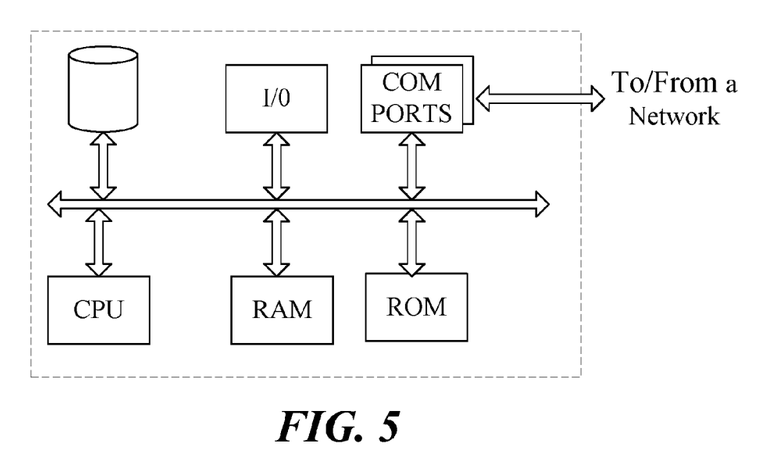
FIG. 5 illustrates a network or host computer.
Figure 6:
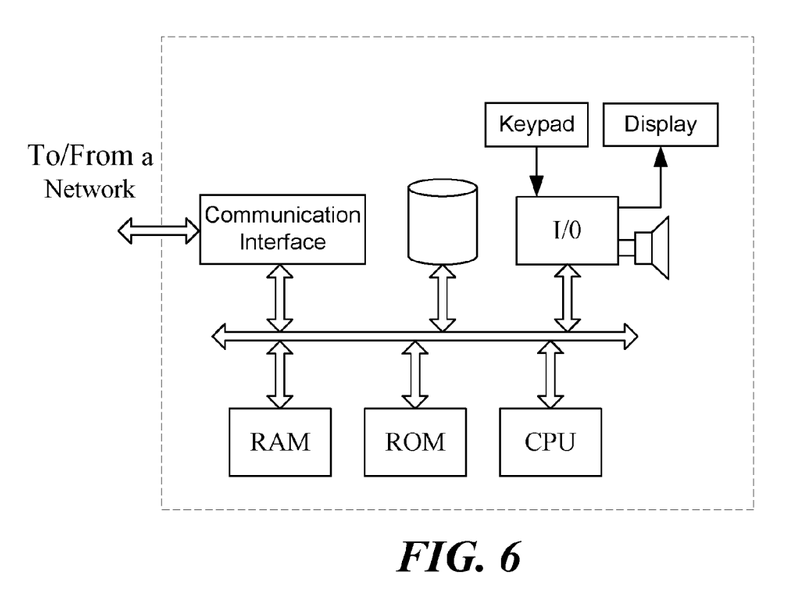
FIG. 6 illustrates a computer with user interface elements.

FIGS. 5 and 6 provide functional block diagram illustrations of general purpose computer hardware platforms. FIG. 5 illustrates a network or host computer platform, as may typically be used to implement a server. FIG. 6 depicts a device with user interface elements, as may be used to implement a personal computer, such as computer 134 of FIG. 1 or a workstation, or to implement a computing device, such as a wireline node (e.g., devices 130, 132, 112, 114, and 108 of FIG. 1), although the device of FIG. 6 may also act as a server if appropriately programmed. It is believed that the general structure and general operation of such equipment as shown in FIGS. 5 and 6 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. As used herein, the computer system of FIG. 5 may use a massive parallel processing technology such as Hadoop, Storm, or Spark. Of course, the server functions may be implemented in a distributed fashion on a number of similar platforms, to distribute the processing load. In various other embodiments, the functionality of the monitoring server 122, measurements megastore 120, and the remote health monitoring system, may be combined in one or more server platforms.

The software functionalities involve programming, including executable code as well as associated stored data, e.g., files used for applications on the wireline nodes to receive data from disparate sources by the processing layer, retrieving contextual information from the measurements megastore, analyzing the data from disparate sources and the contextual information, identifying whether the node is new or previously existing, identifying malfunctions with each node, and providing notifications. The software code is executable by the computing device. In operation, the code is stored within the computing device. At other times, however, the software may be stored at other locations and/or transported for loading into the appropriate computing device system. Execution of such code by a processor of the computing device enables the computing device to perform functions of retrieving information, analyzing the information, providing notifications, etc., in essentially the manner performed in the implementations discussed and illustrated herein.

Hence, aspects of the methods of receiving and processing node data as outlined above may be embodied in programming. Program aspects of the technology may be thought of as "products" or "articles of manufacture" typically in the form of executable code and/or associated data that is carried on or embodied in a type of non-transitory machine readable medium.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

While examples herein are in the context of a wireline telecommunication provider, it will be understood that the concepts discussed herein may be applicable in other use cases as well.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A monitoring server comprising:
   a processor;
   a network interface coupled to the processor configured to enable communications via a wireline communication network;
   a storage device for content and programming; and
   a program stored in the storage device having a data processing layer, an intelligence layer, and an automation layer wherein execution of the program by the processor configures the monitoring server to perform acts comprising:
   receiving data from disparate nodes by the processing layer via the wireline communication network;
   determining, by the intelligence layer, whether a first node from the disparate nodes is new or is pre-existing;
   upon determining that the first node is new:
     applying a first set of static rules to the data received from the first node;
     upon determining that one or more criteria based on the first set of static rules are met, storing the determination in a measurements megastore server;
     upon determining that one or more criteria based on the first set of static rules are not met:
       retrieving contextual information from the measurements megastore server related to the first node;
       determining a status of nodes in a critical path of the first node based on the contextual information;
       identifying a root cause of why the one or more criteria based on the first set of static rules are not met; and
       sending a notification based on the root cause of why the one or more criteria based on the first set of static rules are not met;
   upon determining that the first node is pre-existing:
     applying a second set of static rules to the data received from the first node;
     upon determining that one or more criteria based on the second set of static rules are met, storing the determination in the measurements megastore server;
     upon determining that one or more criteria based on the second set of static rules are not met:
       retrieving contextual information from the measurements megastore server related to the first node;
       applying complex rules to the data received from the first node
       identifying a root cause of why the one or more criteria based on the second set of static rules are not met based on the complex rules; and
       sending a notification based on the root cause of why the one or more criteria based on the second set of static rules are not met.

2. The monitoring server of claim 1, wherein the determination by the intelligence layer whether a first node is new is based on an identification information received in the data of the first node.

3. The monitoring server of claim 1, wherein execution of the program further configures the monitoring server to perform acts comprising:
   upon identifying a root cause of why the one or more criteria based on the first set of static rules are not met, identifying an alert priority by the automation layer for the new node; and
   upon identifying a root cause of why the one or more criteria based on the second set of static rules are not met, identifying an alert priority by the automation layer for the existing node.

4. The monitoring server of claim 1, wherein the notification includes instructions operative to automatically cure a malfunction of the first node.

5. The monitoring server of claim 4, wherein the notification is sent to one or more nodes in the critical path of the first node instead of the first node.

6. The monitoring server of claim 1, wherein identifying a root cause of why the one or more criteria based on the first set of static rules are not met includes determining, from the retrieved contextual information of the measurements megastore, whether one or more other nodes in the critical path of the first node are responsible.

7. The monitoring server of claim 1, wherein the notification is sent by the automation layer of the monitoring server to the first node.

8. The monitoring server of claim 1, wherein the first set of static rules require key performance indicators (KPIs) that are of better quality than the KPIs of the second set of static rules.

9. The monitoring server of claim 1, wherein a node comprises:
   customer premises equipment (CPE) in the form of at least one of a modem, telephone, router, switch, gateway, home networking adapter, and an internet access gateway; and
   a concentration node in the form of at least one of a digital subscriber line access multiplexer (DSLAM), or a broadband network gateway (BNG).

10. The monitoring server of claim 1, wherein the contextual information retrieved from the measurements megastore server comprises at least one of: (i) historic performance data of the first node, (ii) performance data of one or more nodes in the critical path of the first node, and (iii)

performance data of other nodes having at least one of (i) a similar software, (ii) a similar hardware, and (iii) being in the same geographic region.

11. The monitoring server of claim 1, wherein the data received by the data processing layer includes at least one of a signal to noise ratio (SNR), a number of dropped uplink requests, a number of downlink requests, throughput, volume of traffic, number of resets in a predetermined period, and round trip delay time (RTT) of the first node.

12. The monitoring server of claim 1, wherein execution of the program further configures the monitoring server to perform acts comprising:
   upon receiving data from the disparate nodes, determining whether the data from the first node is corrupt;
   upon determining that the data from the first node is corrupt, discarding the data from the first node; and
   upon determining that the data from the first node is not corrupt, storing the data from the first node in the measurements megastore server.

13. The monitoring server of claim 1, wherein the notification is sent to at least one of an account holder and a network administrator of the node, via at least one of a text message, an e-mail, a telephone call, and a posting on social media to be provided on a computing device of the account holder in the form of at least one of a message on a display, a sound through a speaker, and a haptic feedback on the computing device.

14. The monitoring server of claim 1, wherein:
   the notification is automatically sent to one or more nodes of a same platform as the first node and having at least one of (i) a same hardware, (ii) a same software, (iii) and a same operating system; and
   the notification includes instructions operative to change one or more settings on the one or more nodes of the same platform to prophylactically prevent a malfunction on the one or more nodes having the same platform.

15. The monitoring server of claim 1, wherein execution of the program further configures the monitoring server to perform acts comprising:
   machine learning via one or more intelligence models performed on a predetermined training set by the intelligence layer and operative to identify patterns and trends in the data from the first node and based on the contextual information received from the measurements megastore server.

16. A non-transitory computer-readable medium having stored thereon a plurality of sequences of instructions which, when executed by one or more processors cause an electronic device to:
   receive data from disparate nodes layer via the wireline communication network;
   determine whether a first node from the disparate nodes is new or is pre-existing;
   upon determining that the first node is new:
      apply a first set of static rules to the data received from the first node;
      upon determining that one or more criteria based on the first set of static rules are met, store the determination in a measurements megastore server;
      upon determining that one or more criteria based on the first set of static rules are not met:
         retrieve contextual information from the measurements megastore server related to the first node;
         identify a root cause of why the one or more criteria based on the first set of static rules are not met; and
         send a notification based on the root cause of why the one or more criteria based on the first set of static rules are not met;
   upon determining that the first node is pre-existing:
      apply a second set of static rules to the data received from the first node;
      upon determining that one or more criteria based on the second set of static rules are met, store the determination in the measurements megastore server;
      upon determining that one or more criteria based on the second set of static rules are not met:
         retrieve contextual information from the measurements megastore server related to the first node;
         apply complex rules to the data received from the first node
         identify a root cause of why the one or more criteria based on the second set of static rules are not met based on the complex rules; and
         send a notification based on the root cause of why the one or more criteria based on the second set of static rules are not met.

17. The non-transitory computer-readable medium of claim 16, wherein execution of the instructions further causes the electronic device to:
   upon identifying a root cause of why the one or more criteria based on the first set of static rules are not met, identifying an alert priority for the new node; and
   upon identifying a root cause of why the one or more criteria based on the second set of static rules are not met, identifying an alert priority for the existing node.

18. The non-transitory computer-readable medium of claim 16, wherein the notification includes instructions operative to automatically cure a malfunction of the first node.

19. The non-transitory computer-readable medium of claim 18, wherein the notification is sent to one or more nodes in the critical path of the first node instead of the first node.

20. The non-transitory computer-readable medium of claim 16, wherein identifying a root cause of why the one or more criteria based on the first set of static rules are not met includes determining, from the retrieved contextual information of the measurements megastore, whether one or more other nodes in the critical path of the first node are responsible.

21. The non-transitory computer-readable medium of claim 16, wherein the first set of static rules require key performance indicators (KPIs) that are of better quality than the KPIs of the second set of static rules.

* * * * *